United States Patent [19]

Leibovich

[11] Patent Number: 4,928,028

[45] Date of Patent: May 22, 1990

[54] PROPORTIONAL PERMANENT MAGNET FORCE ACTUATOR

[75] Inventor: Gregory Leibovich, Fullerton, Calif.

[73] Assignee: Hydraulic Units, Inc., Duarte, Calif.

[21] Appl. No.: 314,753

[22] Filed: Feb. 23, 1989

[51] Int. Cl.[5] ........................ H02K 33/12; H01F 7/08

[52] U.S. Cl. ........................................ 310/23; 335/266

[58] Field of Search ............................. 310/23, 30, 34; 335/234, 235, 236, 261, 266

[56] References Cited

U.S. PATENT DOCUMENTS

| | | | |
|---|---|---|---|
| 3,070,730 | 12/1962 | Gray et al. | 317/190 |
| 3,332,045 | 7/1967 | Rodaway | 335/81 |
| 4,422,060 | 12/1983 | Matsumoto et al. | 335/266 |
| 4,514,710 | 4/1985 | Conrad | 335/230 |
| 4,533,890 | 8/1985 | Patel | 335/234 |

*Primary Examiner*—Patrick R. Salce

*Assistant Examiner*—Judson H. Jones

*Attorney, Agent, or Firm*—Poms, Smith, Lande & Rose

[57] ABSTRACT

A direct current linear drive actuator including first and second electromagnets, each having a cup-shaped ferromagnetic stator core with an axially extending concentric annular main pole member on the centerline thereof. First and second independent stator coils are recieved within the annular recesses of the stator cores. The open ends of the stator cores face one another with a washer-shaped ferromagnetic common pole member, positioned intermediate the open ends in perpendicular relation to the stator main poles. The armature is spring biased to a neutral position and includes a disc-shaped permanent magnet configured for being received within the inner opening of the common pole and is sandwiched between first and second disc-shaped pole members, each having an overall configuration sufficient to overlap the perimeter of the common pole in the radial direction. Air gaps are formed between the stator poles and the armature poles. Energization of the coils simultaneously provides a first attractive force between a first armature pole and the common pole, a repulsive force between the first armature pole and a first main electromagnet pole, a second attractive force between the second armature pole and the second main electromagnet pole and a second repulsive force between the second armature pole and the common pole.

42 Claims, 4 Drawing Sheets

FIG. 3.
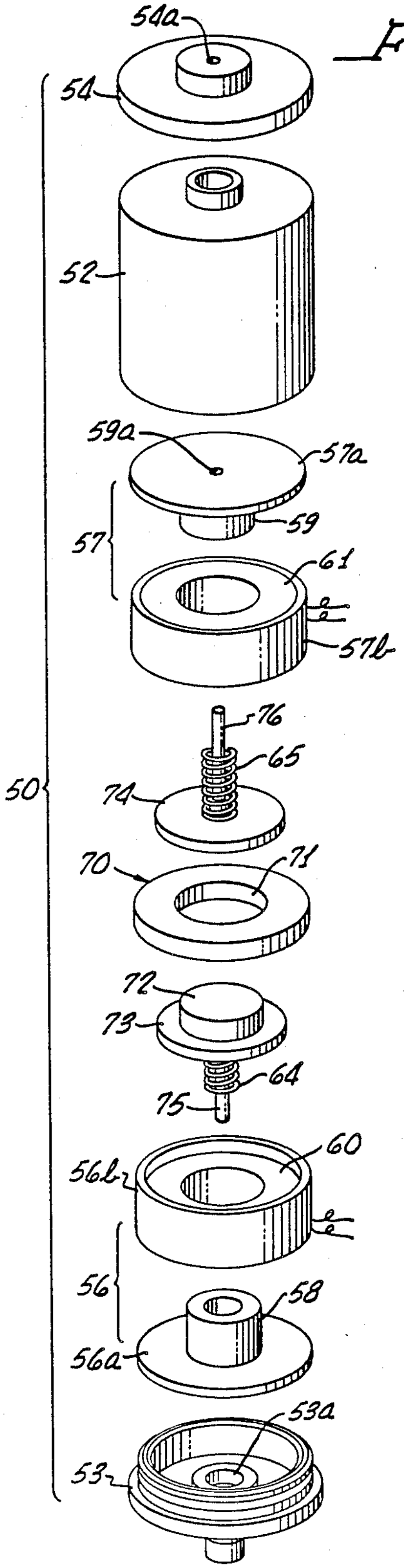
FIG. 4.
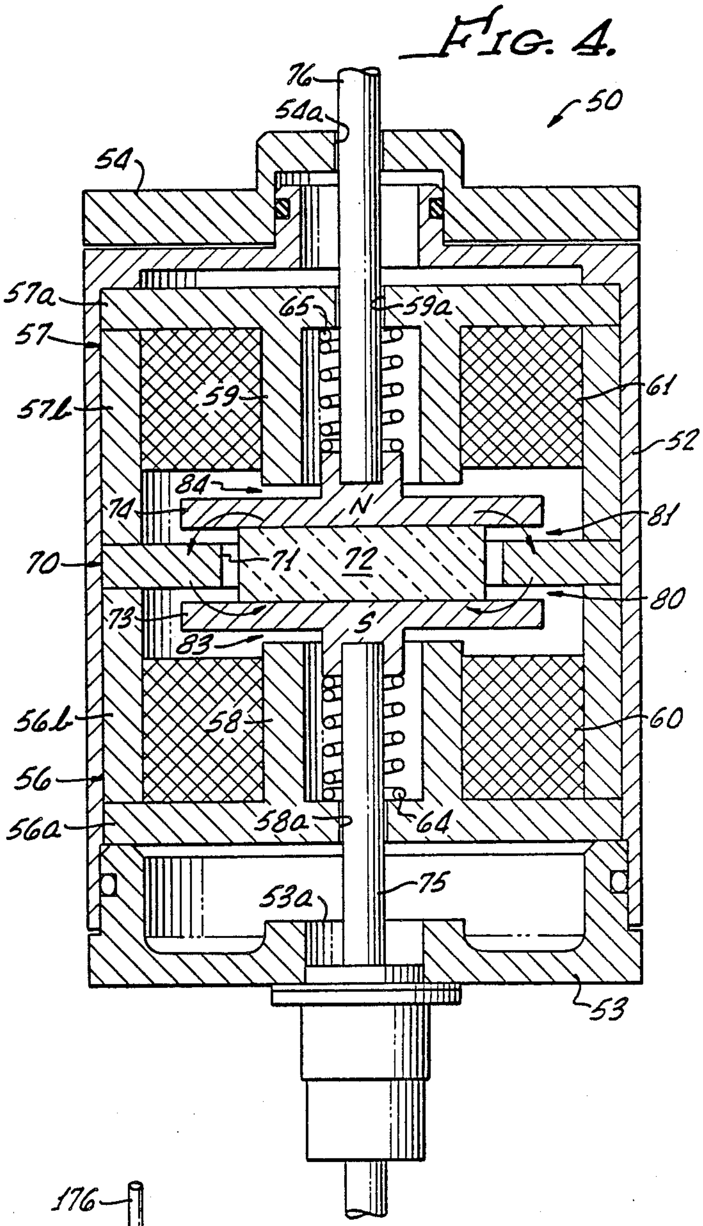
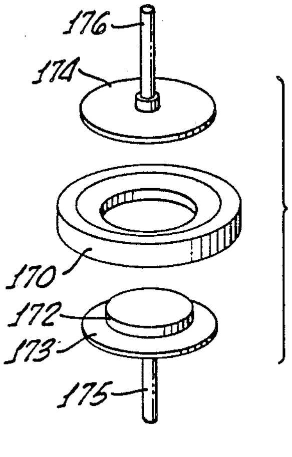
FIG. 7.

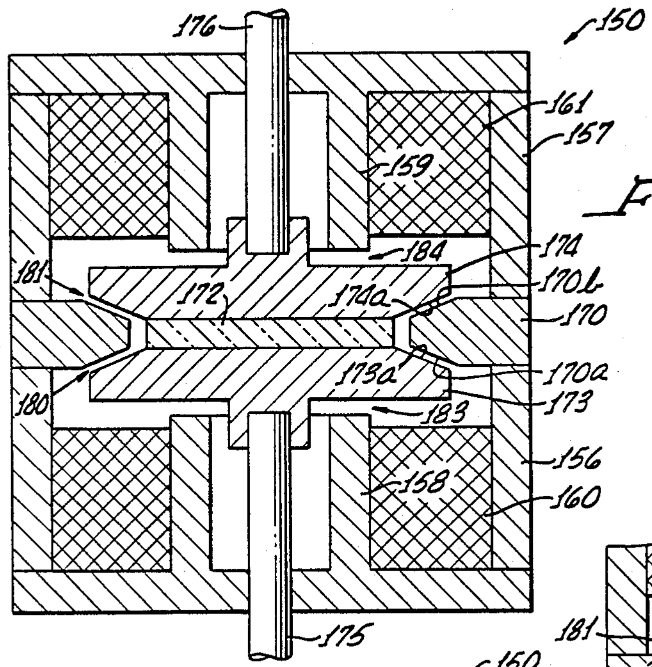
FIG. 8.
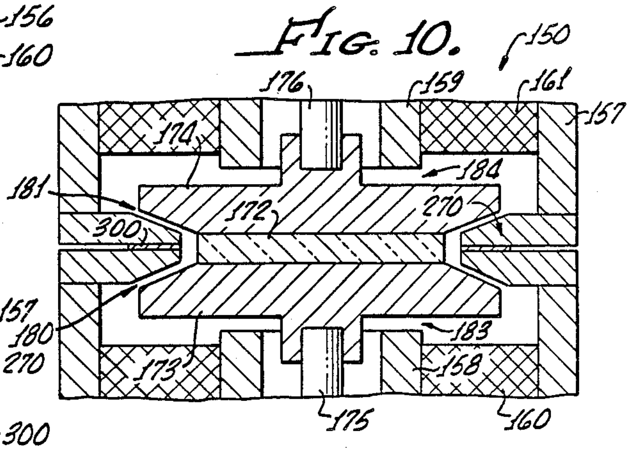
FIG. 10.
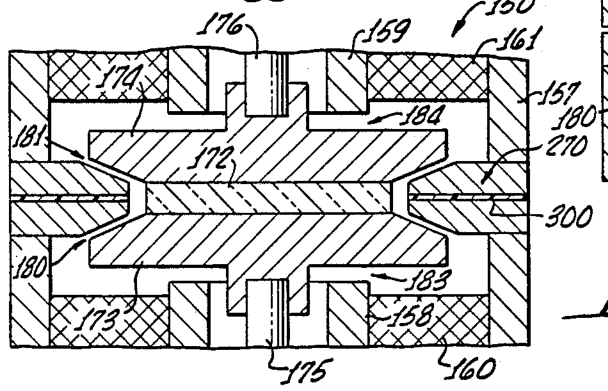
FIG. 9.
FIG. 11.
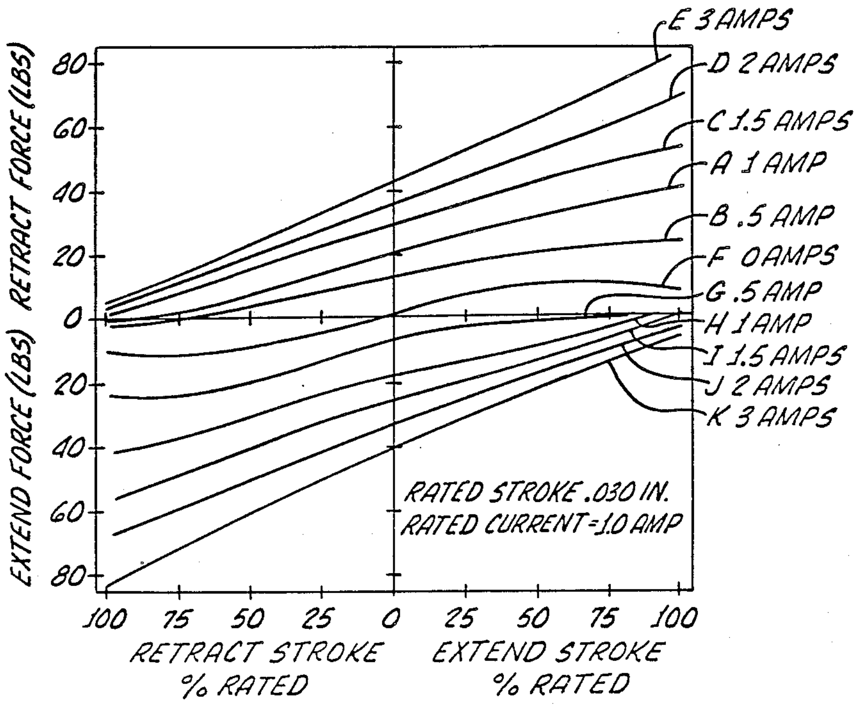

PROPORTIONAL PERMANENT MAGNET FORCE ACTUATOR

BACKGROUND OF THE INVENTION

The background of the invention will be discussed in two parts.

FIELD OF THE INVENTION

This invention relates to electromagnetic actuators or linear motors, and more particularly to a direct current linear proportional permanent magnet force actuator having the magnet in the armature structure thereof.

DESCRIPTION OF THE PRIOR ART

Linear actuators or motors are utilized in a wide variety of applications, such as two position or three-position actuators. One particular application of such actuators is for valve position control, such as in hydraulic circuits. However, with hydraulic valve actuators, certain environments generate critical design parameters which are not readily met by actuators of current design. For example, in the aerospace environment, such as actuators for aircraft hydraulic systems, weight is a major factor, as is force per unit of energy. In addition, small size and capability of operation in harsh temperature environments are dictated by aerospace usage. In aircraft hydraulic systems, linear or proportional motors are employed to actuate valve spools in hydraulic systems which, in turn, actuate aircraft control surfaces, such as ailerons and flaps. In effect, low power devices are used to control high power hydraulic systems. With high pressure hydraulic systems of up to 8000 psi pressure, highly reliable linear and proportional controls are required. In hydraulic systems, there is always the possibility of the presence of contamination in the hydraulic fluid, which contamination may include slivers or chips of metal. Thus, powerful actuators are necessary to overcome any particles or chips in the hydraulic valve. This parameter is sometimes referred to as "chip shearing force", that is the actuator must have a sufficient amount of force to shear any chips which may exist in the valve components, and which cause obstruction to closure of the hydraulic valve. In current practice, in order to reduce size and weight, permanent magnets formed of rare earth materials are utilized to provide a large amount of flux per unit volume in such actuators, such magnets being combined with electrically energizable coils in either the stator or armature.

One such device is shown and described in U.S. Pat. No. 3,070,730, entitled "Three-Position Latching Solenoid Actuator", which issued to Gray et al on Dec. 25, 1962, the device being a solenoid incorporating solenoid windings and a permanent magnet within the stator structure to control one of the three positions and in which the permanent magnet is never subjected to demagnetizing flux from the associated solenoid windings.

Another such device is disclosed in U.S. Pat. No. 332,045, entitled "Permanent Magnet and Electromagnetic Actuator", which issued to Rodaway on Jul. 18, 1967, the apparatus including an actuator having a permanent magnet armature and a pair of electromagnetic coils for moving the actuator armature in opposite directions.

Another such apparatus is disclosed in U.S. Pat. No. 4,514,710, entitled "Electromagnetic Actuator", such patent issued on Apr. 30, 1985 to Conrad. The patent discloses an electronic actuator having an armature movable between the legs of a U-shaped structure of magnetic material and guided by a sleeve of non-magnetic material which is held in place by an annular member of the magnetic material. A permanent magnet is located between the legs and is secured between the magnetic structure and the annular member to form a magnetic path through the parts and to magnetically latch the armature in either of two positions. Electromagnetic coils are mounted on the sleeve on opposite sides of the annular member to selectively drive the armature to either of such positions.

Another such apparatus is disclosed in U.S. Pat. No. 4,533,,890, entitled "Permanent Magnet Bistable Solenoid Actuator", which issued to Patel on Aug. 5, 1985, such patent disclosing a bistable actuator including a permanent magnet assembly secured to an armature shaft and a pair of core elements axially disposed on either side of the permanent magnet assembly, with the cores having axially disposed inner and outer annular extensions defined in each core by a central axial opening which supports the armature shaft and an annular recess in which is received an electrical coil. The permanent magnet assembly includes inner and outer annular axially magnetized permanent magnets radially spaced by a ferromagnetic ring so as to be aligned with the inner and outer core extensions.

Prior art motors or actuators which use electromagnetic circuits in combination with permanent magnet circuits, as part of the stator or armature, in large part, utilize the permanent magnet as part of the flux path for the electromagnetically generated flux. Permanent magnets, as a general rule, have little capability to carry external magnetic flux, and, when placed in series with ferromagnetic elements, act much in the manner of an air gap, that is permanent magnets have a high reluctance and low permeability. Due to this high reluctance, in systems using a permanent magnet in series with ferromagnetic elements of an electromagnetic circuit, there is a large decrease in the efficiency of the actuator. In some prior art systems, there is a saturation of common ferromagnetic circuit elements, which also adversely affects linearity of force or displacement versus current.

In accordance with an aspect of the invention, it is accordingly an object of the invention to provide a new and improved direct current linear actuator.

SUMMARY OF THE INVENTION

The foregoing and other objects of the invention are accomplished by providing first and second electromagnets, each having a generally identical cup-shaped stator core formed of a ferromagnetic material, with an axially extending concentrically positioned annularly configured main pole member on the centerline thereof. First and second stator coils are received within the annular openings within the stator cores with each stator coil being independently energizable from a direct current source. The stator cores are positioned in axially aligned relation with the open ends facing one another with a washer-shaped common pole member, formed of ferromagnetic material, positioned intermediate the open ends to define a common pole path for both electromagnets. The common pole is generally perpendicular to the main central poles of the stator members. The armature includes a disc-shaped permanent magnet member having a diameter slightly less than the inner opening of the washer-shaped common pole and is positioned or sandwiched in intimate magnetic relation with first and second generally identically configured ferromagnetic disc members, each having an outer diameter greater than the diameter of the permanent magnet and sufficient to at least partially overlap the washer-shaped center pole member in the radial direction. The thickness of the common or center pole is adjusted to the thickness of the permanent magnet in the axial direction a distance sufficient to provide uniform air gaps on both sides of the center pole. Working air gaps are formed between facing surfaces of the center pole and the armature poles, and auxiliary air gaps are formed between the facing surfaces of the main poles and the opposite surfaces of the armature poles. The armature is biased to a neutral position by spring members on opposite sides thereof about the armature shaft. The coils are wound, arranged and independently fed to simultaneously provide a first attractive force between a first armature pole and the common pole, a repulsive force between the first armature pole and a first main electromagnet pole, and a second attractive force between the second armature pole and the second main electromagnet pole, and a repulsive force between the common pole and the second armature pole, with the fluxes being concentrated in the main and auxiliary air gaps and virtually no flux from the electromagnet passing through the permanent magnet, to thereby provide a highly efficient actuator while precluding saturation of the magnetic circuit elements in operation.

Other objects, features and advantages of the invention will become readily apparent from a reading of the specification, when taken in conjunction with the drawings, in which like reference numerals refer to like elements in the several views.

BRIEF DESCRIPTION OF THE DRAWINGS

FIG. 3 is an exploded perspective view of a first embodiment of a linear permanent magnet direct current actuator in accordance with the invention, partially broken away and partially in cross-section;

FIG. 4 is a cross-sectional diagrammatic view of the actuator of FIG. 3 with the armature thereof in the neutral position with the coils deenergized showing the magnetic poles thereof;

FIG. 7 is an exploded perspective view of an alternate embodiment of the stator center pole and armature pole structure for use in the actuator of FIG. 3 in accordance with the invention;

FIG. 8 is a cross-sectional partially diagrammatic view of the actuator of FIG. 3 utilizing the stator center pole and armature pole structure of FIG. 7;

FIG. 9 is a partial or fragmented cross-sectional partially diagrammatic view, similar to a portion of FIG. 8, with non-magnetic members interposed in the center pole to vary the flux distribution;

FIG. 10 is a partial or fragmented cross-sectional partially diagrammatic view, similar to a portion of FIG. 8, with a reduced diameter washer-shaped member interposed in the center pole to vary the flux distribution;

FIG. 11 is a graphical illustration of force versus displacement for varying levels of current of the prior art actuator of FIGS. 1 and 2;

DESCRIPTION OF THE PREFERRED EMBODIMENT

In prior art direct current actuators utilizing permanent magnets and ferromagnetic components, variations in permeance and reluctance through the flux paths affect the efficient conversion of the electromagnetic and permanent magnet energy to force, such as axial force on a drive shaft. This efficient flux distribution is further altered by air gaps within the magnetic circuit, which air gaps vary in dimension as the armature shaft is displaced in response to predominant combined electromagnetic fields.

In the Patel patent (U.S. Pat. No. 4,533,890), hereinabove described, the magnetic circuit is closed through the permanent magnet itself. Subsequent prior art devices have attempted to eliminate or minimize closing of the magnetic circuits through the permanent magnet, but have resulted in saturation of common circuits upon energization of the electromagnets.

Figure 1:
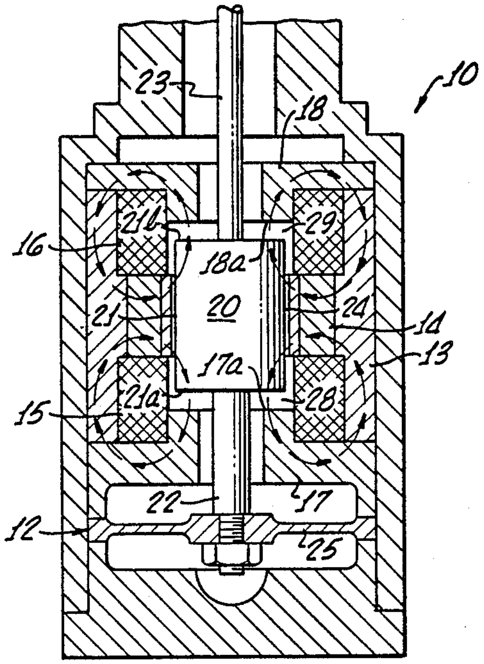
FIG. 1. (PRIOR ART)
FIG. 1 is a side cross-sectional view of a prior art electromagnetic actuator showing flux paths in the absence of energization of solenoid coils.
Figure 2:
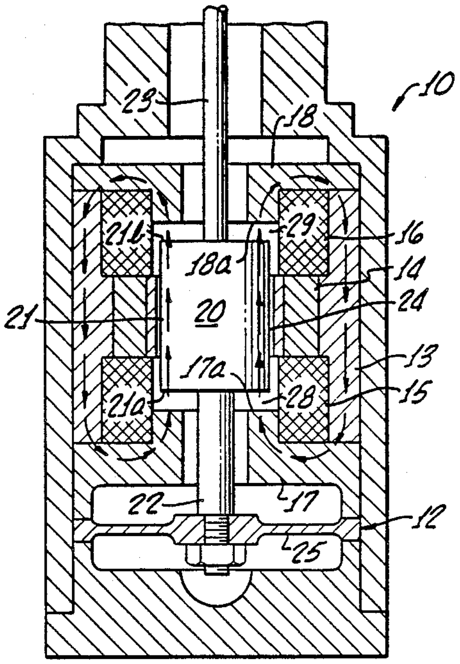
FIG. 2. (PRIOR ART)
FIG. 2 is a side cross-sectional view of the prior art electromagnetic actuator of FIG. 1 showing the flux paths resulting from the electromagnets only with the solenoid coils energized.

One such prior art electromagnetic actuator device is shown in the drawings, in FIGS. 1 and 2, in which the prior art electromagnetic actuator, generally designated 10, includes a generally cylindrical housing 12 having mounted therein a stator structure and an armature structure. The stator structure includes a magnet/electromagnet assembly including an annular or ring shaped permanent magnet 14 formed of rare earth material, such as samarium cobalt or neodymium iron, suspended between opposing aligned annular or toroidal energizing coils 15,16. As an additional part of the stator assembly, an annular sleeve 13, formed of ferromagnetic material, encircles the exterior of the permanent magnet 14 and coils 15, 16, with the inner diameter of the sleeve configured to closely conform to the exterior shape of the combined magnet 14, coil 15,16, structure. This combination of sleeve 13, permanent magnet 14, and coils 15,16 thus forms an electromagnetic-permanent magnet sleeve. The sleeve is, in turn, attached to opposing annular ferromagnetic stator pole pieces 17,18, attached to the interior of the housing. The pole pieces 17,18 are generally L-shaped in cross section with the coils 15,16 nested at the inner corners thereof, with the inner arm portions of the pole pieces 17,18 having the edges 17*a*, 18*a*, respectively, thereof in facing axially aligned relation to provide a cylindrical working armature volume inside the combined annular volume of the electromagnetic-permanent magnet sleeve. This then forms a composite stator to provide magnetic flux to an armature, generally designated 20.

The armature 20 includes a cylindrically configured main body portion 21 formed of a ferromagnetic material having opposing end faces 21*a,* 21*b* supported by first and second axially aligned shaft extensions 22, 23 for transmitting the force. A first shaft extension 22 is coupled to the center of a return spring member 25, the outer periphery of which is clamped relative to the housing. The outer diameter of the main body portion 21 of the armature 20 is configured for travel between the opposing inner edges 17*a,*18*a* of the pole pieces 17,18. Working air gaps 28,29 are formed between the surfaces of the end faces 21*a,* 21*b* of the main body portion of armature 20 and the respective edges 17*a,*18*a* of the pole pieces 17,18. An auxiliary annular air gap 24 is formed in the space between the inner surface of the permanent magnet ring 14 and the outer surface of the main body portion 21 of the armature 20.

The permanent magnet ring 14 is magnetized in a radial direction to form the flux pattern shown by the arrows in FIG. 1, which flux is concentrated for passage through the edges 17*a,*18*a* of the pole pieces 17,18. The flux attributable to only the permanent magnet ring 14 has a symmetrical pattern established through the auxiliary annular air gap 24, through ferromagnetic main body portion 21 of armature 20, through the working air gaps 28,29, through the edges 17*a,*18*a* of the pole pieces 17,18, through the back iron or sleeve 13, and back to the permanent magnet ring 14.

In this prior art construction, only one pole of the magnetic ring 14 is exposed to interaction with a magnetic field to be induced by the coils 15,16, and also, it is emphasized that, with this construction, the area of the working air gaps 28,29 are smaller than the area of the magnet 14.

FIG. 2 depicts the same structure as FIG. 1 with the coils 15,16 energized to drive the actuator shaft 22. The coils 15,16 are similarly wound as two solenoid coils of the same number of windings, and connected in a manner in which the fluxes from each coil aid each other to form a single solenoid interrupted by the magnetic ring 14. The flux of the coils for a given coil current direction is established through the main body portion 21 of armature 20, through the working air gap 29, through pole piece 18, through the back iron or sleeve 13, through pole piece 17, through working air gap 28 and back to the main body portion 21 of the armature 20.

In the absence of current through the coils 15,16, the flux density in both air gaps 28,29 is equal, and there is no force acting on the armature 20, as a consequence of which the main body portion 21 is in its quiescent or neutral equilibrium position shown in FIG. 1. When current is applied to the coils 15,16, the flux density in air gap 29 increases, and the flux density in air gap 28 decreases, with the difference in flux densities producing a force which is applied to the armature 20, causing it to be displaced upwards as viewed in the drawings, which displacement thus reduces the axial length of working air gap 29, and correspondingly increases the axial length of the air gap 28. The displacement of armature 20 is limited by the force of the return spring 25, which force opposes the shift of the armature 20 from its neutral state. The initial displacement of the armature 20 also causes some redistribution of the magnetic flux of magnet 14 which departs from a symmetrical configuration to an asymmetrical configuration with flux density higher at the air gap 29 and lower at the air gap 28. This redistribution of magnetic flux produces additional displacement force to further increase the flux density in air gap 29.

With the coils 15,16 energized, this results in superimposition of the flux of the coils 15,16 on the flux of the permanent magnet ring 14, with the following results. The flux density in the top part of the armature 20, air gap 29, pole piece 18, and the top part of the back iron or sleeve 13 is the sum of the flux from the permanent magnet ring 14 and the flux from the two coils 15,16, that is, the fluxes present in the top part are additive. These additive fluxes create sufficiently high flux density that approaches the saturation level of the ferromagnetic portions of the magnetic circuit, or, at least approaches the knee of the magnetization curve.

At the same time, the bottom part of the actuator 10, the flux density is reduced, that is, the magnetic fluxes are in subtractive relation, with the total flux being the difference between the flux of the permanent magnet ring 14 and the flux of the coils 15,16. This resulting reduced flux is not restricting the increase of current in the coils 15,16. With a further increase in the current, there is a tendency to cause an increase in flux density in the upper half of the magnetic circuit, which may result in the ferromagnetic portions exceeding saturation. With saturation exceeded, there is a loss of linearity between current, force and displacement, which results in a drastic reduction of actuator efficiency. That is, these conditions affect the parameters of actuator force, displacement characteristics and the amount of current required to produce a specified force on the output shaft.

Saturation of the common magnetic circuit elements also leads to a reduction of the magnetic permeance coefficient, with the magnets' load lines shifting downward in the second quadrant of the B-H curve, or the flux density in the magnet goes down, further affecting actuator efficiency. An additional factor in reduction of actuator efficiency relates to the saturation of the common elements in the upper half of the actuator, which causes an increase in the reluctance of the magnet magnetic circuit causing part of the magnet magnetic flux to shift back to a symmetrical flux pattern. This shift to a symmetrical flux pattern tends to reduce the flux in the air gap 29 and increase it in the air gap 28, which serves to additionally reduce the force and displacement versus current, thereby, again reducing overall actuator efficiency.

In accordance with the present invention, by reference to FIG. 3 and 4, there is shown an actuator, generally designated 50, which includes a housing, formed of an outer sleeve 52 and first and second end caps 53,54. The actuator includes first and second generally identical cup-shaped stator cores 56,57, each being formed of two parts 56*a,* 56*b,* 57*a,* 57*b,* of ferromagnetic material, each having an axially extending concentric annularly configured pole member 58, 59 on the centerline thereof. The stator 56, for example, has the portions 56*a* formed as a disc with the pole 58 formed integrally therewith. The other portion 56*b* is formed as a sleeve having an outer diameter generally equal to the diameter of the disc part of portion 56*a.* As shown in FIG. 4, the two parts are assembled to form a cup-shaped member with an annular recess about the pole 58, which then receives the coil 60 therein. The other stator 57 likewise receives the other coil 61 in the annular space about the pole member 59. The poles 58 and 59, in the axial direction, have a length less than the length of the sleeves 56*b,* 57*b,* and the inner diameter of the pole members 58 and 59 are sufficient for receipt therein of bias spring members 64,65, respectively, the purpose of which will be described hereafter.

The disc portions of the portions 56*a*,57*a* each have a centrally disposed aperture. The first and second stator windings or coils 60,61 are received within the annular openings between the poles 58,59 and the sleeves 56*b*,57*b*, respectively, with each stator winding being independently energizable from a direct current source. A washer-shaped center pole member 70, formed of low reluctance ferromagnetic material, is positioned intermediate the open ends of the two cup-shaped stator members 56,57 to define a pole path generally perpendicular to the annular central poles 58,59 of the stator members 56,57.

The armature includes a disc-shaped permanent magnet 72 having a diameter slightly less than the inner opening 71 of the washer-shaped pole member 70 and is positioned or sandwiched in intimate magnetic relation with first and second generally identically configured low reluctance ferromagnetic disc members 73,74, each having an outer diameter greater than the diameter of the permanent magnet 72 and sufficient to at least partially overlap the washer-shaped center pole member 70 in the radial direction. The permanent magnet 72 is formed of a rare earth material such as samarium cobalt or neodymium iron. The permanent magnet 72 is of a thickness in the axial direction sufficient to provide uniform air gaps on both sides of the center pole. Each disc 73,74 has attached or affixed thereto a rod or shaft 75,76, respectively, the shafts 75,76 then extending through apertures 58*a*,59*a* in the center of the poles 58,59 and through apertures 53*a*, 54*a* in the end caps 53,54. Mechanisms (not shown) that are to be driven by the actuator are attached to one or both of the shafts 75,76 in a conventional manner. The various components of the actuator and the permanent magnet member 72 have hereinabove been described as circular or disc-shaped, but it is to be understood that such components may take any convenient form, such as square, or the like.

Figure 5:
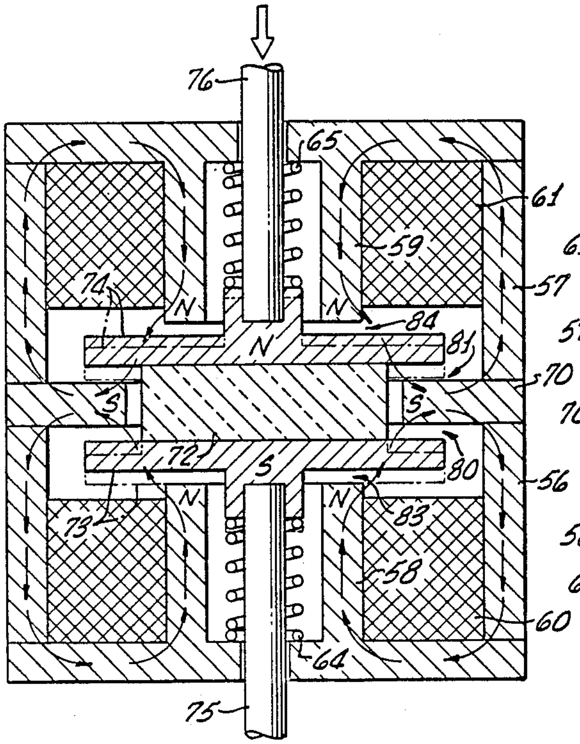
FIG. 5 is a cross-sectional diagrammatic view of the actuator of FIG. 3 with the armature thereof activated to a first position showing the magnet poles and electromagnet pole and the flux paths thereof.
Figure 6:
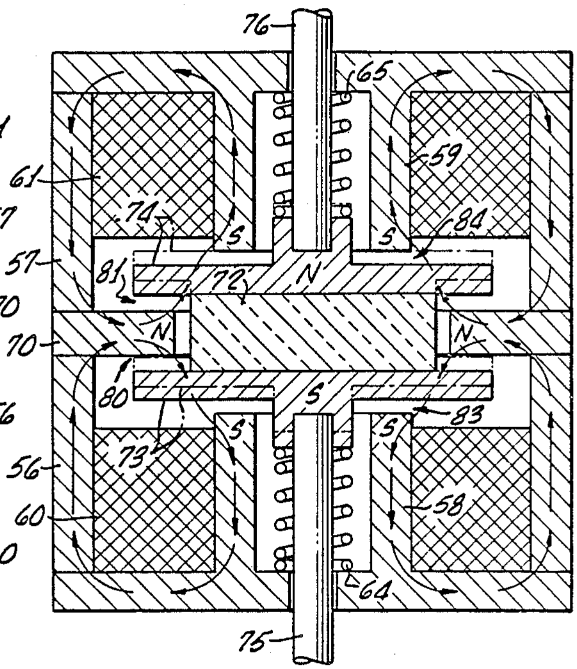
FIG. 6 is a cross-sectional diagrammatic view of the actuator of FIG. 3 with the armature thereof activated to a second position opposite the first position and showing the magnet poles and electromagnet poles and the flux paths thereof.

FIGS. 5 and 6 diagrammatically depict the actuator 50 in cross-section in the assembled condition, with the housing portions removed, that is, with sleeve 52 and end caps 53,54 removed. The drawings have been marked to show the flux paths and the polarity of the various poles 58, 59 and 70 during quiescence, and at different directions or polarities of energization of the coils 60,61.

FIG. 4 diagrammatically depicts the actuator 50, with the coils 60,61 deenergized. The ferromagnetic stator path, for the lower part, includes the bottom and peripheral structure of the cup-shaped lower stator member 56, and the annular axial pole member 58, which acts in conjunction with the washer shaped center pole 70 and armature pole 73. Correspondingly, for the upper part, the ferromagnetic path includes the top and peripheral structure of the upper cup-shaped stator member 57, and annular axial pole 59, which, likewise, acts in conjunction with the washer shaped center pole 70 and armature pole 74. With this configuration, the stator is essentially a three pole electromagnetic structure, which, as will be described, interacts with a two pole permanent magnet armature structure. The stator poles include axially aligned annular poles 59 and 58, and the center or common pole 70, which, as can be seen, is intermediate the poles 59,58 and lies in an orthogonal plane, that is, pole 70 is at ninety degrees to the other two poles 59,58.

The armature includes the two poles formed by the two disc-shaped pole members 73,74, with the disc-shaped permanent magnet 72 sandwiched therebetween. As shown, the diameter of the two disc-shaped armature pole members 73,74 are identical, and sufficient to overlap, in the radial direction, a significant portion of the intruding area of the stator center or common pole 70. Also, the diameter of the permanent magnet 72 is slightly smaller than the inner diameter of the opening 71 of the center or common pole 70 and positioned coaxial therewith to provide generally equal spacing between the perimeter of magnet 72 and the adjacent surface of the openings 71 of pole 70. The axial thickness of the permanent magnet 72 is equal to the width or thickness of the washer-shaped pole member 70 plus the dimension of the two identically dimensioned axial working air gaps 80,81. The air gaps 80 and 81 are in the space formed between the parallel surfaces of the outer peripheries of armature poles 73,74, respectively, and the adjacent opposite surfaces of the center pole 70. The dimensions of the parts are such that the innermost extension of the pole 70, that is, the inner periphery of opening 71, lies outside, or is offset from, the axis of the poles 58, 59. In addition, auxiliary air gaps 83 and 84 are formed, respectively, between the under surface of armature pole 73 and the upper edge of axial pole 58, and between the upper surface of armature pole 74 and the lower edge of axial pole 59. These auxiliary air gaps 83,84 are of equal dimension to one another, in an axial direction, and are equal to or exceed the dimension of working air gaps 81,82 in the axial direction.

The armature is completed by the axially disposed aligned shafts 75,76, which extend through apertures 58*a*,59*a*, respectively, of members 56,57, with the armature return springs 64,65 encircling shafts 75,76, and nested within the recesses of poles 58,59. The springs 64,65 are identically configured coil springs; with each being compressed between the seat of the recess and the adjacent part of the surface of the disc-shaped armature pole members 73, 74.

In FIG. 4, the parts are shown in the neutral condition, that is, with the coils 60,61 deenergized. The armature is arranged with the polarity indicated, that is, the north pole "N" is above the magnet 72 and the south pole "S" is below the magnet 72. In this state, the flux from the permanent magnet 72 passes from the magnet 72 in the direction indicated by the arrows, that is, from magnet 72 through the upper armature pole 74 through the air gap 81 through the center stator pole 70 through the air gap 80 and through the lower armature pole 73, and the second parallel magnetic path indicated by the arrows in the peripheral structure of the device.

This configuration of electromagnetic field and permanent magnet field is symmetrical about a horizontal axis, that is, a line drawn horizontally through the center of the center pole 70. In other words, with the coils 60,61 properly energized for extension or retraction, the armature sees like poles in an axial direction, and a common pole of the opposite polarity through pole 70. The armature always exhibits a fixed polar orientation through the disc shaped poles 73 and 74, that is, pole 74 is always north and pole 73 is always south. The maximum throw of the actuator 50 is determined by the length of the air gaps 80 and 81 due to the intrusion of the center pole 70 into the armature interpole space between poles 73 and 74.

For actuation of the actuator 50, the coils 60 and 61 are energized in such a manner that the armature is simultaneously subjected to both an attractive force and a repulsive force. This is accomplished as follows by reference to FIG. 5. In FIG. 5, the coils 60 and 61 are energized to provide a south polarity on the center pole 70, and correspondingly, the stator poles 59 and 58 will have a north polarity, that is, there will be two north poles and one south pole, with the south pole being intermediate and offset from the north poles, and at a ninety degree angle to the axis of the north poles. The poles are appropriately designated "N" and "S" as applicable. The armature moves to the extended position (shown in dotted lines in FIG. 5), that is, downwardly as indicated by the arrow above shaft 76, thereby compressing spring 64 while permitting upper spring 65 to expand.

Basically, with the coils 60,61 thus energized, the south pole "S" of armature pole 73 is attracted to the north pole "N" of lower pole 58 of the cup-shaped member 56. At the same time north pole "N" of the armature pole 74 is attracted to the south pole "S" of the center pole 70. Correspondingly, and simultaneously, the north pole "N" formed in the upper armature pole 74 is repelled by the north pole "N" of pole 59 of the upper cup-shaped member 57, and the south pole "S" of the armature 73 is repelled by the south pole "S" of the center pole 70. There are two attractive and two repulsive forces, all acting to drive the armature downwardly. As the armature moves downwardly, the upper air gap 81 decreases and the lower air gap 80 increases. With generally identically configured parts and coils 60,61, the repulsion force is in aiding relation to the attraction force, with both forces acting in the same direction. The current to the coils 60,61 may be varied to provide proportional control of the movement of shafts 75,76, as required for the particular valve or other device so controlled.

In FIG. 6, the coils 60,61 are energized in an opposite direction to retract the armature. In this instance the armature polarity remains the same due to the polar orientation of the permanent magnet 72. However, the polarity of the axial poles 58,59 is opposite to the extending condition, with both poles being south ("S") poles. Correspondingly, the center pole 70 is now a north ("N") pole. Attraction now exists between armature pole 74 (north) and axial pole 59 (south), as well as armature pole 73 (south) and center pole 70 (north); and likewise, a repulsion force is exerted between axial pole 58 (south) and armature pole 73 [south), as well as center pole 70 (north) against armature pole 74 (north). Consequently, there are two attraction forces and two repulsion forces acting in concert. Again, the forces are all acting in the same direction, and, moreover, with the armature poles 73,74 overlapping the center pole 70, the maximum number of lines of attraction and repulsion forces are generally perpendicular to the surfaces defining air gaps 80 and 81, that is, these lines of force are generally parallel to the axis of the aligned shafts 75,76.

In accordance with the present invention, both poles 74 and 73 of the magnet 72 are accessible and exposed to the interaction with the coil flux, which essentially doubles the area and volume of the working air gaps 80 and 81, which are the main energy storage and conversion zone.

The single piece magnet 72 and its ferromagnetic poles 73 and 74 closely follow the intrinsic flux distribution pattern of the magnet 72, thus enhancing the armature magnet permeance coefficient or magnet flux density. In other words, the shape and position of the ferromagnetic poles 73 and 74 are such that they do not cause significant distortions of the inherent flux distribution pattern of the magnet, thus promoting optimum utilization of the energy of the permanent magnet 72.

At the same time, both poles 59,58 of the electromagnets have the same polarity, which collectively provide flux to the common ferromagnetic center pole 70, which flux is concentrated in the interpole space of the ferromagnetic armature poles 73,74 of the permanent magnet 72, to pass through center pole 70 and thereby further boost the flux density in the air gaps 80,81 where the flux density becomes maximum. In other words, unlike the prior art hereinabove described, the configuration of the present invention does not utilize the permanent magnet itself as a path for the electromagnetically generated flux. The configuration of the present invention utilizes the energy of the magnet to a higher degree and eliminates common magnet and electromagnet saturated magnetic circuits.

The electromagnetic poles are formed by the axial poles 58,59 and the common center pole 70 with flux carried through the back iron, that is, the sleeve portions of the stator cores 56,57. Being formed of a low permeability high reluctance material, the permanent magnet 72 is not a good path for flux generated by the electromagnets. With the configuration shown and described, the electromagnetically generated flux has a readily available high permeability low reluctance path through the interpolar region via the common center pole 70. In this manner, whether the force resulting from the flux of the permanent magnet 72 is attracting or repelling, it is always aiding.

With a balanced configuration, saturation of the common magnetic circuit elements is avoided, even with abnormal operating currents on the coils 60,61, thus maintaining the high magnet's permeance coefficient, and providing little or no effect on the permanent magnet 72 load line, or flux density, thus resulting in an improved actuator efficiency.

Each of the permanent single polarity ferromagnetic armature poles 73,74 (that is, pole 74 is always north and pole 73 is always south) is placed between poles of an individual electromagnet (for example, on the one hand, the coil 60 and its surrounding ferromagnetic circuit including axial pole 58 and center pole 70, and on the other hand, the coil 61 and its surrounding ferromagnetic circuit including axial pole 59 and center pole 70), thereby enabling one permanent magnet 72 to interact fully with two electromagnets. This arrangement further increases the area and volume of the working air gaps 80,81 and creates two main air gaps and auxiliary aiding air gaps, which carry the maximum flux available from the magnet 72 at a high permeance coefficient (load line). In addition, with the use of the permanent single polarity ferromagnetic armature poles 73,74, it makes it possible to efficiently organize the magnetic system of the actuator of the present invention.

Compounding of the energy of the two electromagnets in one common pole 70 is achieved without connecting the rest of the electromagnetic circuits in series, which thereby precludes saturation of the electromagnet ferromagnetic elements. In addition, the magnetic circuit of the permanent magnet 72 is also separated from the ferromagnetic magnetic circuit of each electromagnet to further provide linearity and efficiency of the magnetic system.

The magnetic circuit of each electromagnet is now closed through the high permeability armature pole 73 or 74 of the magnet. In contrast, the magnetic circuits of the electromagnets in U.S. Pats. No. 3,332,045 and 4,533,890 are completed through the permanent magnet, which has a permeability close to the permeability of an air gap. In the present invention, in contrast to the prior art, the completion of the electromagnetic magnetic circuit through high permeability elements, such as ferromagnetic armature poles 73,74, rather than through low permeability elements such as permanent magnets, minimizes losses and concentrates all available energy from the electromagnets into working air gaps 80,81.

The structure of the magnetic system of the actuator 50 also provides the magnetic circuit of the permanent magnet 72 with high permeability, least path possible, magnetic circuit elements through the main armature pole 73, through one high area air gap 80, through the ferromagnetic common or center pole 70 of the electromagnets, through the other high area air gap 81 and back to the main armature pole 74 which is of opposite polarity. The auxiliary magnetic circuit through the air gaps 83,84, through the stator axial poles 58,59 and the back iron of the electromagnets, that is, the peripheral and closed end portions of the stator cores 56 and 57, supplement the permanent magnet efficiency, thereby boosting its permeance coefficient.

As can be seen, in accordance with the present invention, the individual magnetic circuits of the actuator 50 are configured and mutually arranged in a special way such that each individual ferromagnetic and magnetic circuit complements the efficiency of the other circuits, thereby contributing to the overall efficiency of the magnetic structure of the actuator 50. As a consequence, the actuator 50 of the present invention is not just a system of interacted components, but a special mutual arrangement of a configuration of components, resulting in magnetic and electromagnetic subsystems, each of which complements the efficiency of the adjacent subsystems and, thereby results in overall system efficiency.

This efficiency can be seen with the armature of the actuator 50 actuated to an extended position. In an extended position, the armature pole 74 abuts against the upper surface of common pole 70, thereby reducing working air gap 81 to zero. Simultaneously, the armature pole 73 abuts against main stator pole 58, thereby reducing the auxiliary air gap 83 to zero. This displacement of the armature creates additional force at the extreme positions of a stroke, such as the extended position. With a zero air gap through one auxiliary and one working air gap, the partial increment of magnet permeance and magnet flux takes place. These now magnetically short-circuited branches are parallel to the main magnet's flux through the center pole 70 and air gap 80. The reduction of this circuit magnetic reluctance results in additional force, which is a property of the herein described magnetic structure. This force allows the placing of a considerable amount of energy in the centering spring 64, without drawing excessive current. The charged spring 64 is thus capable of bringing the armature back to a neutral position in the event of power failure, which is a critical requirement for an aerospace environment valve spool driven by a linear actuator.

FIG. 8 illustrates a modification to the actuator 50, which modified actuator is designated 150, and utilizes the structure depicted in FIG. 7. Similarly, the parts corresponding to the parts of the actuator 50 have been designated with the same reference numerals increased by 100. That is, for example, the stator cores corresponding to cores 56 and 57 are designated 156 and 157, etc. In this depiction, the armature springs have been omitted for clarity. In this embodiment, the configuration of the stator common pole 170 and the poles 173 and 174 of the armature have been altered. The armature poles 173 and 174 are identically configured and have the outer perimeters **173*a*, 174*a* thereof tapered, that is, the poles 173, 174 are frustoconically configured, and positioned in facing relation with the smaller diameter surfaces thereof in facing relation. The permanent magnet 172 is of a smaller thickness in the dimension between these surfaces. Correspondingly, the inner extending portions of the common pole 170 are tapered to form lower and upper tapered surfaces 170*a* and 170*b*, the angles of which correspond to the taper of the outer edge surfaces 173*a* and 174*a* of the poles 173,174. The gaps therebetween are the working air gaps 180 and 181, in which the armature pole edge surfaces 173*a*, 174*a* are parallel to the common pole surfaces 170*a*, 170*b*. The auxiliary air gaps 183, 184 are essentially unchanged, and their dimensions correspond to the axial dimensions of the working air gaps 180, 181. With this configuration, the normal length of the air gaps is less than that of actuator 50** with an equal axial stroke length, and an increase in the area of the air gaps further decreases the reluctance of the air gaps, which was originally reduced by the shorter air gaps, thus increasing the attractive and repulsive forces.

In order to modify the characteristics of the actuator 150, other modifications may be made, such as to the common pole as depicted in fragmentary views in FIGS. 9 and 10. In FIG. 9, the common pole, designated 270 has been split in the horizontal direction, and a washer shaped member 300 has been inserted. This member 300 may be an insulating material, with a permeability equivalent to that of air, or may be a ferromagnetic material of different permeability than that of the common pole member 270. To further modify and shape the electromagnetic path, as shown in FIG. 10, the washer shaped member 300 may have an outer diameter smaller than the outer diameter of the common pole 270, resulting in a peripheral recess or peripheral air gap of high reluctance, with the flux concentrated through the washer shaped member 300.

Other variations may likewise be made by one of ordinary skill in the art to the motors 50 and 150, such as increasing the thickness of the parts forming the ferromagnetic circuit, varying the thickness or the composition of the material of the permanent magnet 72 or 172, varying the axial air gaps spacing, to thereby vary the stroke or working distance of the shafts of the motors, and the like. Additionally, the cross-sectional configuration of the various components of the actuator need not be round or circular, but may take any convenient configuration, such as square. Similarly, with or without the above modifications, the force of the springs may likewise be varied to provide more or less resistance to armature movement. With any such modifications, the essence of the actuator will remain unaltered, that is the creation of two electromagnetic circuits, each with a main pole and sharing a common pole, for moving an armature containing a permanent magnet, with magnetic circuits arranged to substantially eliminate the permanent magnet as a series flux path, eliminate common saturated magnetic circuit elements., and concentrate the maximum energy of the magnet in the interpole space of the electromagnets, and deliver the maximum energy of the electromagnet into the interpole space of the magnet.

Figure 12:
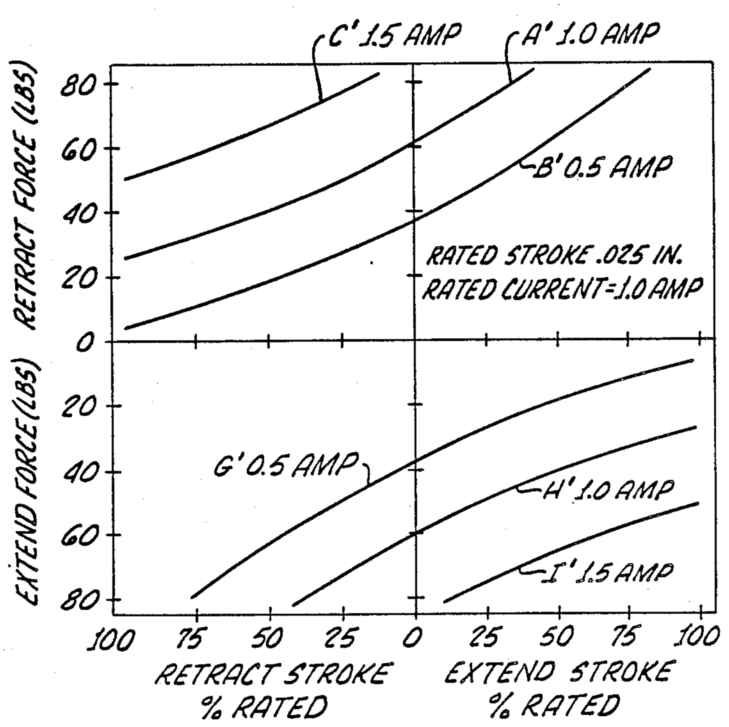
FIG. 12 is a graphical illustration of force versus displacement for varying levels of current of the actuator of FIG. 9.
Figure 13:
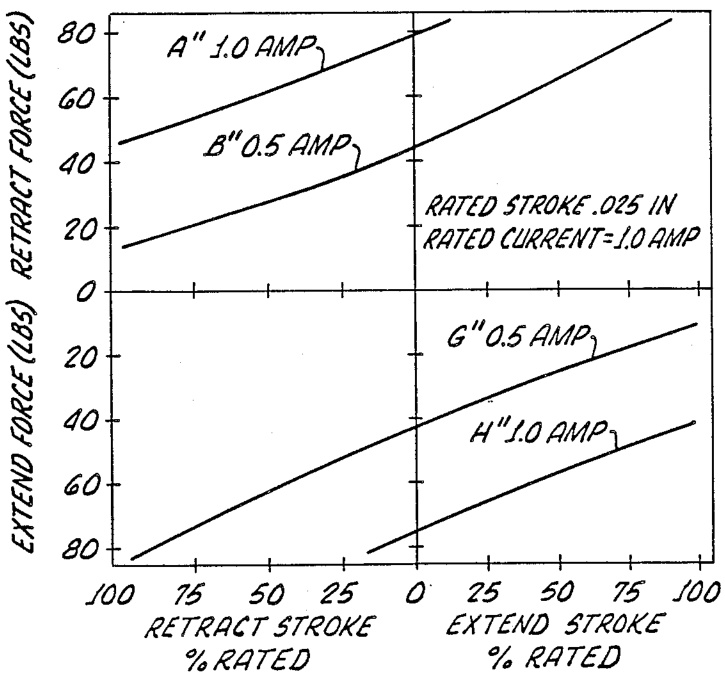
FIG. 13 is a graphical illustration of force versus displacement for varying levels of current of the actuator of FIG. 8.

Referring now to FIGS. 11 through 13, there are shown graphical depictions of force versus displacement of the actuator of the prior art (FIG. 11) and the actuators of the present invention. FIG. 12 is a graph for the actuator 150 of FIG. 8, with the common split pole of FIG. 9 while FIG. 13 shows the graph for the actuator of FIG. 8, with the solid center pole 170. By reference to FIGS. 8 and 9, the actuator of FIG. 8 includes an integral center pole 170, while the center or common pole 270 of FIG. 9 is split transversely and includes a washer member 300, which may be nonmagnetic. The actuators for the curves of both FIGS. 12 and 13 employ the same spring force, and both have a rated stroke of about 0.025 inch. However, for the curve of FIG. 12, the common pole 270 is split and the washer member 300 is a nonmagnetic shim spacer of about 0.0025 inch. With both actuators being the same otherwise, the force/displacement effect of a non-magnetic shim with a split common pole may be readily compared with an actuator having a homogeneous common pole of ferromagnetic material.

With reference to FIG. 11, a family of curves are shown for the force versus displacement characteristics representative of the prior art actuator of FIGS. 1 and 2, the curves being designated "A" through "K". The vertical axis of the graph shows force in pounds, while the horizontal axis shows displacement of "stroke" as a percent of the rated stroke. As depicted on the drawing of FIG. 11, the actuator is rated at one ampere, and the rated stroke is 0.025 inch. By reference to the curve "A", which corresponds to the rated current, it can be seen that the actuator provides 20 pounds of force at "zero" stroke, and as shown in the first quadrant, the maximum force at that current at 100% stroke is about 40 pounds.

By comparison, referring now to FIG. 12, there are shown curves designated A′ through C′ and G′ through I′, which may be contrasted with curves A through C and G through I of FIG. 11. These curves, for each actuator, depict the characteristics for rated current, one-half rated current and one hundred fifty percent of rated current, respectively. As can be seen, with the actuator of the present invention, the force at 1.0 amp (curve A′) for zero displacement, is about 75 pounds, which is more than three times that of the prior art actuator. Furthermore, although the curve has not been fully shown through the rated stroke, it can be extrapolated to a point where the force at rated stroke for the actuator of the present invention would be in excess of 100 pounds, compared with about 40 pounds for the prior art actuator. In high pressure hydraulic lines, powerful actuators are necessary to overcome any particles or chips in the hydraulic valve. This parameter is sometimes referred to as "chip shearing force", that is the actuator must have a sufficient amount of force to shear any chips which may exist in the valve components, and which cause obstruction to closure of the hydraulic valve. With the vastly increased force available for the same amount of current, it is evident that greater chip shearing force is available with the actuator of the present invention.

Corresponding comparisons may be made from the curves of FIGS. 11 and 12 at one-half or one and one-half times rated current. The curves of FIG. 13 are designated A″, B″, G″ and H″, which correspond to force versus displacement for rated current and one-half rated current for the actuator constructions of FIG. 8. Similarly, with reference to a comparison of the curve A″, with curve A of FIG. 11, it can be seen that the force of the actuator of FIG. 8 is almost four hundred percent of that of the prior art actuator.

By comparison of the curves of the FIGS. 12 and 13, which both relate to variations of the actuator of the present invention, it can be seen how the actuator characteristics are altered by varying one element, that is, the common pole. Since design of actuators and electromagnetic devices is in large part an empirical choice, it is obvious that the slopes of the curves, the zero-crossing points, and the linearity within a range may be altered over a spectrum with variations in materials, dimensions and spacing in such a structure. Variations in spring force likewise must be considered in the design of such devices.

In accordance with the present invention, there have been shown and described several embodiments of an actuator in which a permanent magnet is employed in the armature structure with a common pole and back iron arrangement which, for either direction of energization of the coils, simultaneously results in a combination of two attractive forces and two repulsive forces, in aiding relation, with an efficient high power output.

The described arrangement of electromagnetic stator with a common pole and the interposed permanent magnet armature improves the actuator operation by controlling and improving the several magnetic flux paths and patterns, thereby concentrating magnetic flux in areas where the advantage of high flux density is greatest. Primarily, the common center pole, which is a variable single polarity ferromagnetic pole common to both electromagnets and which is located within the interpole space of the permanent magnet armature, helps to concentrate the magnetic flux of both stator electromagnets in the interpole space of the armature poles. Increased flux concentration in this area greatly enhances the force of the interaction between the permanent magnet armature and the stator. The armature, with its constant single polarity ferromagnetic pole, is mounted within the interpole space of the electromagnetic stator for reciprocation therebetween, thereby providing a low reluctance path for flux of each stator electromagnet and enhancing their efficiency. The common stator pole is also positioned in the permanent magnet armature interspace. Therefore, as a secondary function, the common pole provides a low reluctance magnetic path between the constant single polarity armature poles. By this position, the common pole, in addition to concentrating stator flux, provides a low reluctance magnetic path between the permanent magnet armature poles, thereby greatly enhancing the utilization of the permanent magnet energy.

While there have been shown and described preferred embodiments, it is to be understood that various other adaptations and modifications may be made within the spirit and scope of the invention.

What is claimed is:

1. An actuator comprising:

stator means including first and second electromagnetic means, each of said electromagnetic means having main pole means in axial alignment in a first direction with the main pole means of the other and each having common pole means intermediate said main pole means and orthogonal to the direction of said main pole means;

armature means including permanent magnet means with first and second armature pole means having surfaces thereof disposed in spaced relation in said first direction to both said stator main pole means and said common pole means;

means for activating said electromagnet means for simultaneously providing a first attractive force between a first armature pole means and said common pole means, a first repulsive force between the first armature pole means and a first main pole means, a second attractive force between the second armature pole means and the second main pole means, and a second repulsive force between the second armature pole means and said common pole means, and output means for enabling transfer of the relative displacement between said stator means and said armature means to a driven mechanism.

2. The actuator according to claim 1 wherein said first and second electromagnet means includes first and second generally cup-shaped ferromagnetic assemblies each having a centerline, and said main pole means includes a main pole member on said centerline.

3. The actuator according to claim 2 wherein said common pole means has an outside dimension not less than the inside dimension of said cup-shaped ferromagnetic assemblies, and said common pole means includes an inner opening, said common pole means being formed of at least partially ferromagnetic material.

4. The actuator according to claim 3 wherein said cup-shaped members are positioned in open end facing relation with said common pole means interposed therebetween.

5. An actuator comprising:

stator means including first and second electromagnetic means, each of said electromagnetic means having main pole means in axial alignment in a first direction with the main pole means of the other and each having common pole means intermediate said main pole means and orthogonal to the direction of said main pole means;

armature means including permanent magnet means with first and second armature pole means having surfaces thereof disposed in spaced relation to both said stator main pole means and said common pole means;

means for activating said electromagnet means for simultaneously providing a first attractive force between a first armature pole means and said common pole means, a first repulsive force between the first armature pole means and a first main pole means, a second attractive force between the second armature pole means and the second main pole means, and a second repulsive force between the second armature pole means and said common pole means; and output means for enabling transfer of the relative displacement between said stator means and said armature means to a driven mechanism;

said first and second electromagnet means including first and second generally cup-shaped ferromagnetic assemblies each having a centerline, and said main pole means including a main pole member on said centerline, said common pole means having an outside dimension not less than the inside dimension of said cup-shaped ferromagnetic assemblies, and said common pole means including an inner opening, said common pole means being formed of at least partially ferromagnetic material, said cup-shaped members being positioned in open end facing relation with said common pole means interposed therebetween, said cup-shaped assemblies being generally cylindrical, said permanent magnet means including a permanent magnet, and said armature pole means including ferromagnetic members having an outer dimension greater than the dimension of the permanent magnet and sufficient to at least partially overlap the common pole means in the radial direction.

6. The actuator according to claim 5 wherein said permanent magnet is received within said inner opening of said common pole means.

7. The actuator according to claim 6 wherein said first and second armature poles are coupled to opposing surfaces of said permanent magnet in intimate magnetic relation therewith.

8. The actuator according to claim 7 wherein said permanent magnet means are dimensioned and configured for being received intermediate said first and second armature pole means and within said inner opening of said common pole means.

9. The actuator according to claim 1 wherein said permanent magnet means is a permanent magnet and said first and second armature pole means includes first and second generally similar ferromagnetic armature poles having first surfaces thereof spaced in said first direction from said stator main pole means and other surfaces thereof spaced in said first direction from said common pole means.

10. The actuator according to claim 9 wherein said permanent magnet is sandwiched between said first and second armature poles in intimate magnetic relation therewith.

11. The actuator according to claim 9 wherein the gap between the armature poles is greater than the thickness of said common pole means.

12. The actuator according to claim 11 wherein each of said armature poles has a first surface facing the end of a respective one of said main pole means and another surface facing said common pole means.

13. An actuator comprising:

stator means including first and second electromagnetic means, each of said electromagnetic means having main pole means in axial alignment in a first direction with the main pole means of the other and each having common pole means intermediate said main pole means and orthogonal to the direction of said main pole means;

armature means including permanent magnet means with first and second armature pole means having surfaces thereof disposed in spaced relation to both said stator main pole means and said common pole means;

means for activating said electromagnet means for simultaneously providing a first attractive force between a first armature pole means and said common pole means, a first repulsive force between the first armature pole means and a first main pole means, a second attractive force between the second armature pole means and the second main pole means, and a second repulsive force between the second armature pole means and said common pole means; and output means for enabling transfer of the relative displacement between said stator means and said armature means to a driven mechanism;

said first and second electromagnet means including first and second generally cup-shaped ferromagnetic assemblies each having a centerline, and said main pole means including a main pole member on said centerline, said common pole means having an outside dimension not less than the inside dimension of said cup-shaped ferromagnetic assemblies, and said common pole means including an inner opening, said common pole means being formed of at least partially ferromagnetic material.

said common pole means including first and second washer-shaped ferromagnetic members in proximate spaced relation, with the space therebetween occupied by a media having a magnetic permeability different from that of said first and second washer-shaped members.

14. An actuator comprising:

stator means including first and second electromagnetic means, each of said electromagnetic means having main pole means in axial alignment in a first direction with the main pole means of the other and each having common pole means intermediate said main pole means and orthogonal to the direction of said main pole means;

armature means including permanent magnet means with first and second armature pole means having surfaces thereof disposed in spaced relation to both said stator main pole means and said common pole means;

means for activating said electromagnet means for simultaneously providing a first attractive force between a first armature pole means and said common pole means, a first repulsive force between the first armature pole means and a first main pole means, a second attractive force between the second armature pole means and the second main pole means, and a second repulsive force between the second armature pole means and said common pole means; and output means for enabling transfer of the relative displacement between said stator means and said armature means to a driven mechanism;

said first and second electromagnet means including first and second generally cup-shaped ferromagnetic assemblies each having a centerline, and said main pole means including a main pole member on said centerline, said common pole means having an outside dimension not less than the inside dimension of said cup-shaped ferromagnetic assemblies, and said common pole means including an inner opening, said common pole means being formed of at least partially ferromagnetic material, the common pole means having a non-rectangular shaped configuration at said inner opening and said armature pole means having non-rectangular shaped end surfaces mating with and spaced from said non-rectangular portion of said common pole means.

15. An actuator comprising:

stator means including:

(a) first and second generally similar cup-shaped stator core means with a main pole member on the axial centerline thereof;

(b) first and second stator coils received within the cups of said stator core means, said stator core means being positioned with the open ends of the cups facing one another;

(c) common pole means having a central opening and being formed, at least partially, of ferromagnetic material, said common pole means being positioned intermediate the open ends of the cups with said central opening on said centerline for providing a common pole path for both, electromagnets, the main surface of said common pole means being generally perpendicular to the main poles of the stator members;

armature means including:

(a) permanent magnet means configured for being received within said central opening;

(b) first and second ferromagnetic armature pole members coupled to opposing surfaces of said permanent magnet means, said permanent magnet means being sandwiched in intimate magnetic relation therewith, each of said armature pole members having an outer dimension sufficient to at least partially extend beyond said central opening in a direction transverse to said centerline, said armature means being configured for providing air gaps between said armature poles and said common pole means;

means for biasing said armature means to a neutral axial position;

said coils being adapted to receive an energizing current and to simultaneously provide a first attractive force between a first armature pole member and said common pole means, a repulsive force between the first armature pole member and one main pole member, a second attractive force between the second armature pole member and the other main pole member, and a second repulsive force between the second armature pole member and said common pole means; and output means for enabling transfer of the relative displacement between said stator means and said armature means to a driven mechanism.

16. The actuator according to claim 15 wherein said cup-shaped stator core means are circular in cross-section in a direction transverse to said centerline, and wherein said main pole members are annularly configured

17. The actuator according to claim 16 wherein said common pole means has an outer configuration of a diameter not less than the inside diameter of said stator means.

18. The actuator according to claim 15 wherein said common pole means includes first and second similarly configured ferromagnetic members with a space therebetween.

19. The actuator according to claim 18 wherein said common pole means includes other means within said space, and wherein said other means includes a medium having a magnetic permeability different from that of said first and second ferromagnetic members.

20. The actuator according to claim 19 wherein said common pole means has an inner opening having an edge formed in a non-rectangular shape and wherein said armature pole members have a corresponding non-rectangular shape.

21. The actuator according to claim 15 wherein said permanent magnet means includes a generally disc-shaped permanent magnet.

22. The actuator according to claim 21 wherein said first and second ferromagnetic armature pole members are similarly configured, generally disc-shaped members having a diameter greater than the diameter of said permanent magnet member.

23. A direct current actuator comprising:

first and second generally identical cup-shaped ferromagnetic stator cores, each having a cylindrical sleeve portion and an axially extending annular main pole;

first and second coils within the annular recesses of said stator cores, said stator cores being positioned in axially aligned relation with the open ends facing one another;

a generally disc-shaped common pole means having a central opening and being formed, at least partially, of ferromagnetic material, positioned intermediate and in abutting relation with the open ends, the edge of said-opening terminating radially inwards of said sleeve portion and radially outside the diameter of said main poles;

armature means including a permanent magnet member configured and dimensioned for being received within said opening;

first and second ferromagnetic armature poles coupled to opposing surfaces of said magnet in intimate magnetic relation therewith, each of said armature poles being on an opposite side of said common pole means and having an outer dimension greater than the dimension of said central opening and sufficient to at least partially overlap said common pole means in the radial direction in spaced relation therewith;

means for biasing said armature to a neutral position;

said coils, when energized, causing both said main poles to have the same polarity and causing said common pole means to have an opposite polarity for effecting movement of said armature means in a first direction; and output means for enabling transfer of the relative displacement between said stator means and said armature means to a driven mechanism.

24. The actuator according to claim 23 wherein said central opening is generally circular in cross-section.

25. The actuator according to claim 23 wherein said common pole means includes first and second generally identically configured ferromagnetic members with a space therebetween.

26. The actuator according to claim 25 wherein said common pole means includes other means within said space, and wherein said other means includes a media of different magnetic permeability.

27. The actuator according to claim 24 wherein said permanent magnet member is a generally disc-shaped permanent magnet.

28. The actuator according to claim 27 wherein said first and second ferromagnetic armature pole members are similarly configured, generally disc-shaped members having a diameter greater than the diameter of said permanent magnet member.

29. An actuator comprising:

stator means including first and second stator pole means axially aligned with each other in a first direction, and third pole means intermediate said first and second pole means and aligned in a second direction orthogonal to said first direction;

stator coil means adapted to be energized from a current source for causing said first and second pole means to have the same polarity and for simultaneously causing said third pole means to have an opposite polarity;

armature means including permanent magnet means with first and second armature pole means respectively interposed between said first and second stator pole means, said armature means being dimensioned, configured and arranged for enabling electromagnetic attraction of said first and second pole members with selected ones of said first, second and third stator pole means upon energization of said coil means.

30. The actuator according to claim 29 wherein said armature means are dimensioned, configured and arranged for simultaneously enabling electromagnetic repulsion of said first and second armature pole members with selected other ones of said first, second and third stator pole means upon energization of said coil means.

31. The actuator according to claim 30 wherein said third pole means is in proximate relation to said permanent magnet means and spaced therefrom in said first direction.

32. An actuator comprising:

stator means including first and second stator pole means axially aligned with each other in a first direction, and third pole means intermediate said first and second pole means and aligned in a second direction orthogonal to said first direction;

stator coil means adapted to be energized from a current source for causing said first and second pole means to have the same polarity and for simultaneously causing said third pole means to have an opposite polarity;

armature means including permanent magnet means with first and second armature pole members, said armature means being dimensioned, configured and arranged for enabling electromagnetic attraction of said first and second pole members with selected ones of said first, second and third stator pole means upon energization of said coil means, said armature means being dimensioned, configured and arranged for simultaneously enabling electromagnetic repulsion of said first and second armature pole members with selected other ones of said first, second and third stator pole means upon energization of said coil means, said third pole means being in spaced proximate relation to said permanent magnet means, said armature means including permanent magnet means in intimate magnetic relation with said first and second armature pole members, said third pole means including a central opening with said permanent magnet means positioned therein, and said first and second armature pole members being positioned on opposite sides of said central opening.

33. The actuator according to claim 32 wherein said armature pole members are configured, dimensioned and positioned for providing generally uniform spacing between each of said armature pole members and said third pole means.

34. The actuator according to claim 29 wherein said third pole means is formed, at least partially, of ferromagnetic material.

35. An actuator comprising:

stator means including first and second stator pole means axially aligned with each other in a first direction, and third pole means intermediate said first and second pole means, and aligned in a second direction orthogonal to said first direction;

stator coil means adapted to be energized from a current source for causing said first and second pole means to have the same polarity and for simultaneously causing said third pole means to have an opposite polarity;

armature means including permanent magnet means with first and second armature pole members, said armature means being dimensioned, configured and arranged for enabling electromagnetic attraction of said first and second pole members with selected ones of said first, second and third stator pole means upon energization of said coil means, said third pole means including first and second generally similarly configured ferromagnetic members with a space therebetween.

36. The actuator according to claim 35 wherein said third pole means includes other means within said space, and wherein said other means includes a medium of different magnetic permeability.

37. A permanent magnet actuator comprising:

electromagnetic stator means adapted to be electronically activated and having first and second stator poles spaced from one another in a first direction, an intermediate magnetic member connected in magnetic circuit with said stator means and having a third stator pole displaced from both said first and second poles in at least said first direction, each of said first and second stator poles having a like polarity and said third stator pole having a polarity opposite the polarity of said first and second poles when said electromagnetic stator means is activated, an armature mounted for motion relative to the stator means in said first direction, said armature carrying permanent magnet means having a first armature pole of one polarity interposed between said first and third stator poles and having a second armature pole of polarity opposite said one polarity interposed between said second and third stator poles.

38. The actuator of claim 37 wherein said stator poles define a stator interpole space therebetween, said armature being at least partially disposed in said stator interpole space, and wherein said armature poles are spaced from one another to define an armature interpole space, said intermediate magnetic member being formed of a low reluctance material at least partially disposed in said armature interpole space, whereby said intermediate magnetic member tends to concentrate magnetic flux of said first and second stator poles in said armature interpole space, and also provides a low reluctance magnetic path between said armature poles, thereby enhancing the effect of said permanent magnet means.

39. A permanent magnet actuator comprising:

first and second electromagnets of a stator having mutually spaced stator poles, a variable single polarity ferromagnetic common pole member in magnetic circuit with and common to both said stator electromagnets, said common pole member cooperating with said stator electromagnets to define first and second stator interpole spaces, an armature mounted for motion relative to said stator, said armature having a permanent magnet and first and second mutually spaced single polarity ferromagnetic armature poles attached to said permanent magnet, said armature poles being positioned in said first and second stator interpole spaces respectively, and said variable single polarity ferromagnetic common pole member being positioned between said armature poles, whereby flux of said stator poles is conducted by said armature poles in said first and second interpole spaces, and said common pole member provides a low reluctance magnetic path between said armature poles.

40. The actuator of claim 1 wherein all of said forces act in the same direction on said armature means.

41. The actuator of claim 38 wherein each said armature pole extends between said third stator pole and a respective one of said first and second stator poles in a second direction transverse to said first direction.

42. The actuator of claim 40 wherein said armature is mounted for motion in a first direction and wherein said armature poles overlap said common pole member in a direction transverse to said first direction.

* * * * *